L. E. BLANCHARD.
SPEEDOMETER.
APPLICATION FILED JULY 22, 1909.

950,833.

Patented Mar. 1, 1910.

Witnesses.
C. I. Babcock.
J. Murphy

Inventor.
Leon E. Blanchard
per
Jos. H. Churchill
Attorney.

UNITED STATES PATENT OFFICE.

LEON E. BLANCHARD, OF BOSTON, MASSACHUSETTS, ASSIGNOR TO RELIANCE SPEED-METER CO., OF BOSTON, MASSACHUSETTS, A CORPORATION OF MAINE.

SPEEDOMETER.

950,833.  Specification of Letters Patent.  Patented Mar. 1, 1910.

Application filed July 22, 1909. Serial No. 508,972.

*To all whom it may concern:*

Be it known that I, LEON E. BLANCHARD, a citizen of the United States, residing in Boston, county of Suffolk, and State of Massachusetts, have invented an Improvement in Speedometers, of which the following description, in connection with the accompanying drawings, is a specification, like characters on the drawings representing like parts.

This invention relates to a speedometer especially adapted for use on automobiles and like vehicles for indicating the speed of the same.

The present invention has for its object to provide a simple, inexpensive and reliable instrument in which provision is made for adjusting the movement of the pointer or index according to the strength of the governing spring, whereby accurate instruments may be obtained with governor springs of different strengths, which enables a stock spring to be employed. Provision is also made for obtaining an instrument of few parts. To this end, the governor, which is operated by centrifugal force, actuates a crank or arm on a rock-shaft, said crank or arm having adjustably secured thereon, a device which actuates the gearing employed to move the pointer or index. The device referred to is adjustable on said crank or arm toward and from the rock-shaft, so as to vary the extent of movement of the pointer to compensate for variation in the strength of the governor spring. These and other features of this invention will be pointed out in the claim at the end of this specification.

Figure 1:
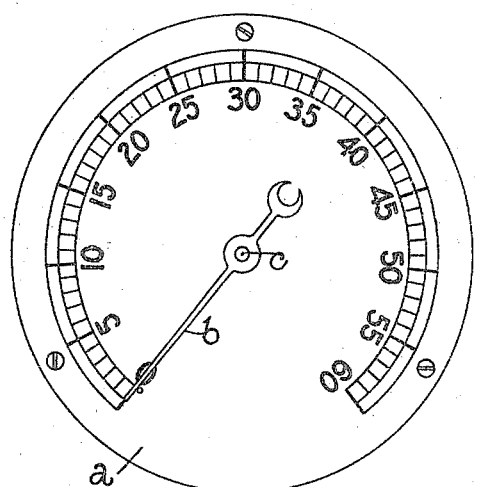
Figure 2:
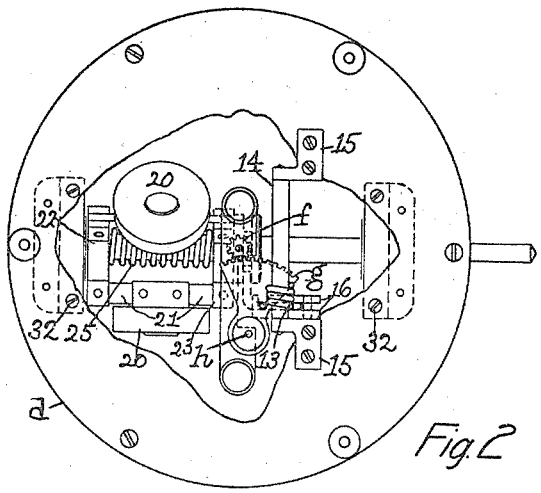
Figure 3:
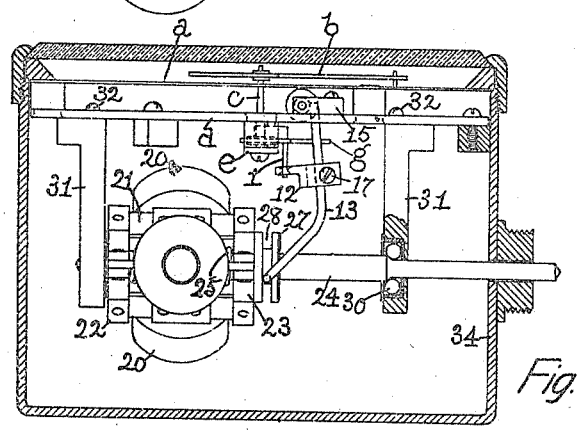

Figure 1 is a plan view of a speedometer embodying this invention. Fig. 2, a plan view with parts broken away and with the dial and pointer removed. Fig. 3, a side elevation and section of the instrument shown in Fig. 1, looking toward the right, and Figs. 4 and 5, details to be referred to.

Referring to the drawing, *a* represents a dial provided with numbers and graduations indicative of miles, and *b* is a pointer or index coöperating therewith. The pointer *b* is fast on a shaft *c* supported by a plate or disk *d* and a bracket *e* attached to the underside thereof, said shaft having a pinion *f*, which meshes with a segmental gear *g* fast on a shaft *h* and provided with a depending stud or pin *i*, which is extended through a slot or opening 10 in a block or device 12, which is adjustably secured on a crank or arm 13 of a rock-shaft 14 journaled in brackets 15 on the upper side of the plate or disk *d*. In the present instance, the block 12 is shown as provided with fingers 16, which are designed to be clamped to the crank or arm 13 by a screw 17, which, when loosened, permits the block or device to be adjusted on the crank or arm toward or away from the rock-shaft, for a purpose as will be described. The crank or arm 13 is designed to be moved by a governor, which is responsive to the speed of the vehicle.

In the present instance, the governor is shown as a centrifugal governor of known construction, and comprising a plurality of weights 20 pivotally connected to levers or links 21, which are pivotally connected with collars or disks 22, 23 on a shaft 24, the collar or disk 22 being fast on said shaft and the collar or disk 23 being loose thereon to be moved longitudinally in one direction by the weights 20 under the influence of centrifugal action and to be moved in the opposite direction by a helical spring 25, which encircles the shaft 24 between said disks or collars.

The movable disk or collar 23 is provided as herein shown with a hub 27 having an annular groove 28 into which extends the bent end of the crank or arm 13, so that the said crank or arm is positively moved in opposite directions by the movable disk or collar 23. The shaft 24 is supported as herein shown by ball bearings 30 in hangers or arms 31 depending from the disk or plate *d*, to the underside of which they are secured by screws 32. The shaft 24 constitutes the main shaft of the instrument and is extended through the casing 34 of the instrument and is connected in the usual manner by a flexible shaft (not shown) with a wheel of the vehicle.

Figure 4:
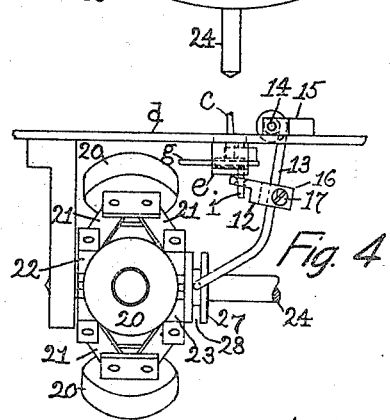
Figure 5:
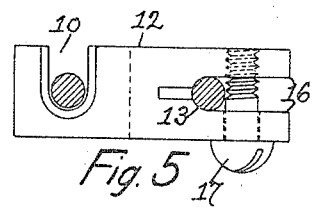

In operation, the main shaft 24 is rotated when the vehicle, whose speed is to be indicated, is in motion, and as the speed of the shaft 24 increases, the weights 20 are moved outwardly as represented in Fig. 4, and draw the collar or disk 23 along the shaft 24 toward the fixed disk 22 and against the resistance of the spring 25, thereby moving the crank or arm 13 with the disk 23 and causing the block or device 12 to turn the segmental gear *g* from substantially the position shown in Fig. 3 to that shown in Fig. 4, with the result that the pinion *f* and its shaft *c* are rotated so as to move the pointer or index *b* from its starting position shown in Fig. 1, over the dial and toward the right, so as to register with the number corresponding to the speed at which the vehicle is traveling. When the speed of the vehicle diminishes, the spring 25 moves the disk 23 in the opposite direction and through the crank or arm 13, block 12, gear *g* and pinion *f* moves the pointer or index back toward its starting position.

The pin *i* on the segmental gear *g* is made long enough, so that the block 12 can be adjusted on the crank or arm 13, so as to compensate for variations in the strength of the governor springs 25, which is an important feature practically, as it enables stock springs to be used, for if it is found in calibrating the instrument that the governor spring 25 is a little weak and permits the pointer to be moved beyond the number indicative of a given speed, say 30 miles, then the block 12 can be adjusted on the arm 13 toward the rock-shaft or pivot 14 for said arm, so as to cause the pointer to move a less distance and to register with the number 30 on the dial when the speed of the shaft 24 is 30 miles an hour. On the other hand, if the governor spring should be a little strong, so that the pointer should register below the proper speed, for instance, 27 miles, when the shaft 24 is being driven at 30 miles an hour, the block or device 12 is moved down on the crank or arm away from the rock-shaft or pivot 14, so as to overcome the increased strength of the spring 25 and cause the pointer or index to register with the proper number on the dial, which in the case taken as an example, is 30. The adjustment of the block or device 12 can be effected in a substantially short time and at a minimum expense.

Claim.

In an instrument of the class described, in combination, a pointer or index, a shaft on which said pointer is mounted, a pinion fast on said shaft, a gear in mesh with said pinion and provided with a pin or projection extended substantially at right angles to the path of rotation of the said gear, a rock-shaft extended substantially parallel to the path of rotation of said gear, a crank or arm on said rock-shaft extended in the same direction as said pin, means movable longitudinally on said crank and connecting the latter with said pin, a main shaft, a centrifugally-operated governor on said main shaft, and means for connecting said governor with said crank or arm to effect movement of said crank or arm in opposite directions by said governor, substantially as described.

In testimony whereof, I have signed my name to this specification in the presence of two subscribing witnesses.

LEON E. BLANCHARD.

Witnesses:
 SAMUEL BROADBENT,
 JAS. H. CHURCHILL.